United States Patent [19]

Trippe et al.

[11] 3,996,065
[45] Dec. 7, 1976

[54] VEHICLE STORAGE BATTERY CELL

[75] Inventors: Gerwin Trippe, Gevelsberg; Jürgen Brinkman, Hagen, both of Germany

[73] Assignee: Varta Batterie Aktiengesellschaft, Hannover, Germany

[22] Filed: Sept. 23, 1974

[21] Appl. No.: 508,638

[30] Foreign Application Priority Data

Nov. 12, 1973 Germany ............................ 2356465

[52] U.S. Cl. .............................................. 429/208
[51] Int. Cl.² ...................................... H01M 10/16
[58] Field of Search ............... 136/80, 79, 166, 168, 136/169, 170

[56] References Cited

UNITED STATES PATENTS

| | | | |
|---|---|---|---|
| 1,488,738 | 4/1924 | Cook et al. | 136/80 X |
| 1,546,101 | 7/1925 | Owen | 136/80 |
| 2,218,621 | 10/1940 | Norberg | 136/80 |
| 2,603,596 | 7/1952 | Vangsnes | 136/80 |
| 2,902,532 | 9/1959 | Toce et al. | 136/80 X |
| 3,369,937 | 2/1968 | Himy | 136/80 |
| 3,443,995 | 5/1969 | Halsall et al. | 136/79 |
| 3,736,191 | 5/1973 | Blandford | 136/168 X |
| 3,832,237 | 8/1974 | Kinsey | 136/166 X |

*Primary Examiner*—John H. Mack
*Assistant Examiner*—C. F. LeFevour
*Attorney, Agent, or Firm*—Weiser, Stapler & Spivak

[57] ABSTRACT

The plates of lead storage battery cells are supported at least from the top by resilient means attached to the cell cover. They may also be supported by resilient means from the cell bottom. The respective resilient means are placed diagonally relative to each other. At least the bottom support means has variable resiliency depending on the external forces applied to the cell.

8 Claims, 3 Drawing Figures

VEHICLE STORAGE BATTERY CELL

The invention relates to a storage battery cell for vehicles, and particularly for submarines.

In lead storage batteries it is customary to place prisms on the bottom of the storage battery cell housings, on which rest the positive and negative plates of a plate stack. These prisms consist preferably of the same material as the cell housing and are formed during the manufacture of the housing as an integral part of that housing. Impacts or shocks are generally applied to batteries via their supporting surface, then through the cell bottom and finally through the prisms of the plate stacks into the cells themselves. Since the material used for the cell housings has only limited elasticity, such blows or shocks applied from the bottom are transmitted unattenuated to the plate stacks. This can cause destruction or damage to the plate stacks.

In special batteries, subjected to very heavy impacts or shocks, the resultant mechanical stress on the plate stack within the cell has been reduced by supporting either the battery within a trough, or the individual cells of the battery with coil or leaf springs or with elastic rubber elements. These techniques are very costly and also require additional space and add weight to the structure.

Accordingly, it is an object of the invention to eliminate one or more of the foregoing drawbacks, and to provide a storage battery cell with a simple but effective arrangement for attenuating and damping externally applied impacts and shocks.

This object and others which will appear are achieved by supporting the positive and negative plates, respectively, with resilient elements from the lid.

In a preferred embodiment of the invention, the positive and negative plates are also respectively supported on the bottom of the cell by means of an additional resilient element. In accordance with the invention, in very heavy cells there are placed on the cell bottom pedestals having recesses into which the plate rests penetrate. These plate rests and the recesses in the pedestals have sides which slope at different angles. Further in accordance with the invention, the upper and lower resilient elements are positioned diagonally with respect to each other.

For further details, reference is made to the discussion which follows in the light of the accompanying drawings, wherein.

The same reference numerals designate similar elements in the different figures.

Figure 1:
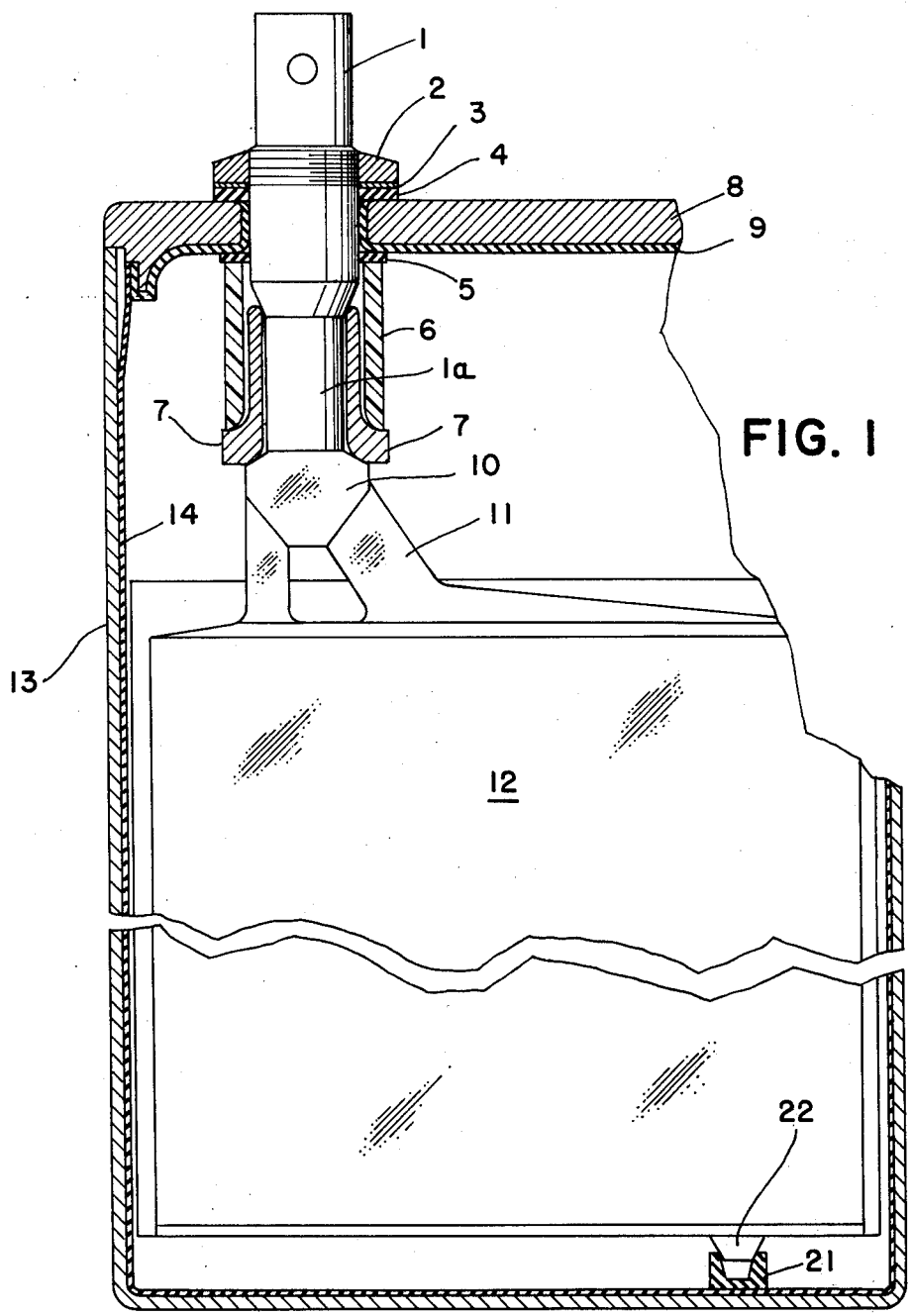
FIG. 1 shows the interior of a cell equipped in accordance with an embodiment of the invention.

Referring to FIG. 1, this shows a cell housing 13, within which oppositely poled plate stacks are positioned, one such plate 12 being visible in FIG. 1.

These plates have plate bolts 1 which protrude partially from cell housing 13. This bolt has a necked-down portion 1a which is surrounded by a split bushing 7. This is held in place by a sleeve 6. Sleeve 6 is made of electrolyte resistant elastic plastic or rubber having relatively low elasticity. Above sleeve 6 there is positioned a ring 5 of rubber or plastic which has relatively high elasticity. This soft ring 5 provides a seal for the lower surface 9 of cell cover 8 and also for the shaft of plate bolt 1.

Above cell cover 8 there are also one or more rings 4 of electrolyte resistant, elastic plastic or rubber having soft resilient properties. Above ring 4 there is a washer 3 which can be tightened more or less tightly by nut 2. Through tightening of nut 2 pressure can be applied against cell cover 8 from both top and bottom via bolt 1, pole bridge 10, the two bushing elements 7, sleeve 6 and rings 4 and 5. By more or less forceful tightening of nut 2, controllable compression of elements 4, 5 and 6 can be produced.

Before inserting plates 12 into cell housing 13, the pedestals 21 are engaged of the rests 22 of both the positive and the negative plates. Pedestals 21 are made of electrolyte resistant material, such as rubber or plastic, and are designed so as to have softly resilient properties. The sides of rests 22 and of pedestals 21 slope at different angles. Specifically the inner sides of the recess in pedestal 21 converge at a more acute angle than the sides of the inserted rest 22. As a result, the resiliency decreases for heavier impacts because the plate rest then increasingly stretches the pedestal and ultimately hits bottom. The diagonal positioning of this pedestal relative to the suspending arrangement for the plate further allows distortion of the grid frame and displacement of individual plates within the plate stack to take place.

It has proven particularly desirable to make resilient elements 4, 5 and 21 of rubber, and resilient elements 6 and 22 of plastic, preferably polyethylene.

The advantage of this arrangement is that low, medium and high frequency vibrations of small displacement and low acceleration originating outside the cell housing are, to a large extent, kept from the plate stack and damped out. Such vibrations are produced in vehicle motive batteries by the characteristics of the path traveled by the vehicle, and by the vibrations of the engine. The arrangement has the further advantage that occasional heavy blows at high acceleration applied from outside the cell are also largely isolated from the plate stack and damped out.

These advantages are attributable to the following:

1. The means supporting the plate stack from the bottom and suspending it from the cell cover, collectively exhibit a progressively varying elasticity.

2. The suspension of the plate stack from the cell cover and the support of the plate stack from the bottom are disposed diagonally relative to each other, so that the forces which operate generally vertically upon the cell housing act upon the plate stack with their lines of force spaced as far apart as possible.

3. The means suspending the plate stack from the cover in effect integrate into the damping system, as an additional resilient element thereof, the entire cell housing with its slightly elastic vertical walls and slightly elastic horizontal cell cover.

4. Through elastic suspension and support of the plate stack relative to the cell housing, accelerations applied from outside lead to movement of the plate stack relative to the cell housing.

Because of this relative movement the electrolyte present within the cell housing is forced, at relatively high velocity, through the closely packed plate stack with its quite large surfaces. The large frictional surface and the relatively high flow resistance exhibited by this tightly packed plate stack also creates considerable damping of relative movements.

Such damping, which includes the braking effect upon relative movement attributable to the high flow resistance, has the advantage that these braking forces are distributed over the entire surface of all the positive and negative plates and their intermediate separators. Consequently, even a very high total braking force places only minimal mechanical stresses on the individual elements of the plate stack.

The progressively variable elasticity of the plate stack suspension is attributable to the previously described combination of elements having soft and hard elasticity characteristics.

The progressively variable elasticity of the plate stack bottom support is attributable to the difference in slope angles of the sides of the plate rests and the plate pedestals, respectively. Because of this difference in slopes the pedestal is progressively spread apart until the rest hits the rubber at which point the support becomes comparatively hard.

The soft elasticity serves to isolate from and to damp the stresses due to externally applied vibrations.

Impacts having high accelerations cause pronounced displacements in the cell and therefore quickly exceed the soft range. These high forces are then dissipated over a relatively short distance. Moreover, the plates rub against the separators and this frictional interaction also produces damping.

Figure 3:
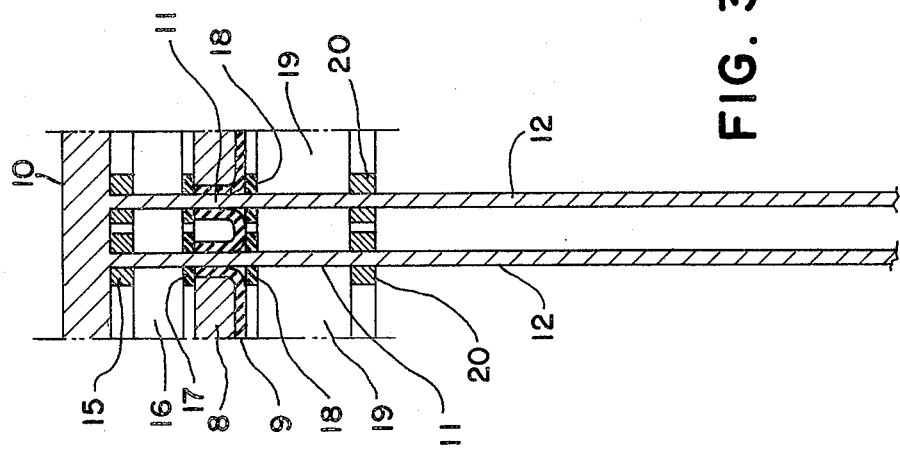
FIGS. 2 and 3 show two mutually orthogonal view of another embodiment of the invention.
Figure 2:
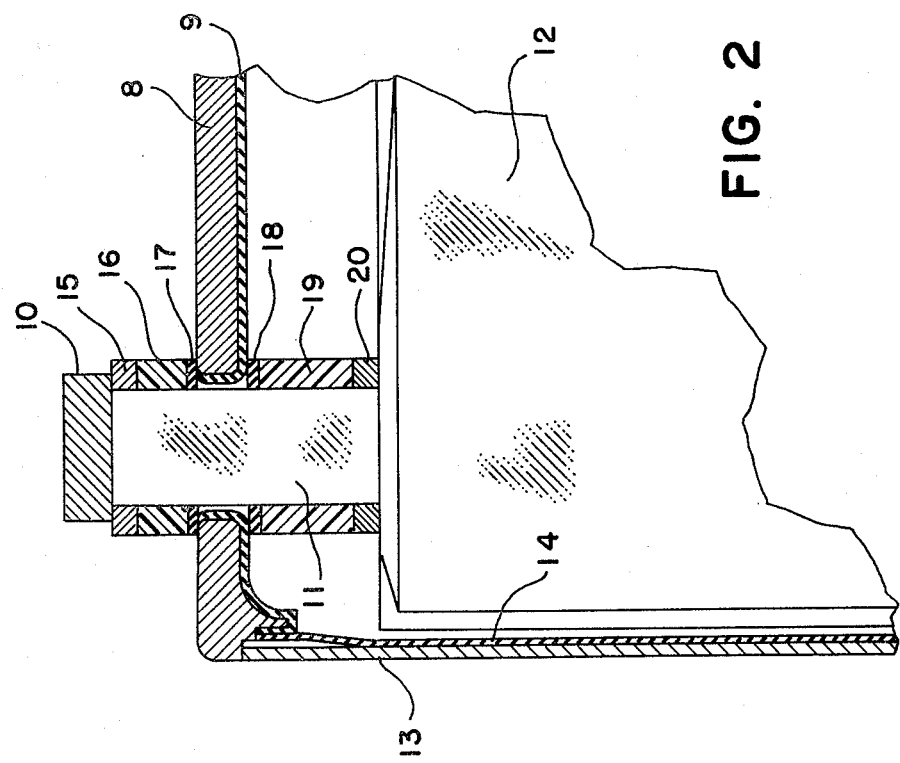

Referring now to FIGS. 2 and 3, these show another embodiment in which each individual plate lug is supported by means of resilient elements. This is suitable for high performance cells, which have relatively low weight and in which it suffices to bring the lug out through the cell cover 8. A bearing 20, which is of electrolyte resistant material, is mounted on plate lugs 11 protruding from cell housing 13. Above this bearing is lower resilient element 19 made of a elastic material, as well as lower sealing ring 18 which seals off lug 11 against the rubberized coating 9 of cell covering 8, and against the lug itself below the superposed cover 8.

Above the cover there is the upper sealing ring 17, as well as the upper resilient element 16, and pressure ring 15 which is normally made of metal. The compression required for the overall damping arrangement is provided by welding pole bridge 10 to plate lugs 11. The pole bridge, which is generally prismatic and metallic, is welded on under predetermined pressure. Preferably, resilient elements 17, 18 are made of rubber, and resilient elements 16, 19 of plastic.

Essentially the same advantages are obtained by this arrangement as by that of FIG. 1. For high performance cells of relatively low weight, it is not essential that the individual plates be also supported from below by means of resilient elements. On the other hand, for cells with heavy plate stacks, resilient elements should also be provided on the bottom of the cell.

We claim:

1. A storage battery cell having positive and negative plate stacks within a housing with a lid, said stacks having pole bolts protruding through the lid, and plate rests extending down from the bottoms of the plates within the housing, said cell being characterized by:
   first resilient means engaging the lid and the pole bolts to support the plate stacks partly from the lid of the housing; and
   second resilient means to support the plate stacks partly from the bottom of the housing,
   the second resilient means including a resilient pedestal upstanding from the housing bottom, and having a recess into which a plate rest is partially inserted, the recess having inner sides with converge at a more acute angle than the sides of the inserted plate rest, and
   the first and second resilient means being positioned diagonally with respect to the battery plates.

2. The cell of claim 1 wherein said first resilient means comprises a resilient element positioned between a bearing attached to the cell pole bolt and the interior surface of the cell lid, and an additional resilient element between a ring attached to said pole bolt and the exterior surface of the lid.

3. The cell of claim 1, wherein the first resilient means comprises two portions of different elasticity.

4. The cell of claim 2 wherein: said ring is the pole nut, said bearing is in the form of a split bushing resting on the pole bridge, and a sealing ring surrounding the pole bolt is positioned between the cover and the first named resilient element.

5. A cell according to claim 2 wherein: said cell also comprises a plate lug, said bearing rests on the frame of the plate, said ring is pressed onto the plate lug, and a sealing ring is positioned between each resilient element and the interior and exterior surface, of the cell lid, respectively.

6. The cell of claim 3 wherein the portion of higher elasticity is made of rubber and the portion of lower elasticity is made of plastic.

7. The cell of claim 3 wherein said portion of higher elasticity is positioned closer to the lid than the portion of lower elasticity, the portion closer to the lid being so positioned as to also provide a seal for the cell.

8. A cell according to claim 5 wherein: the sealing rings for the cell are made of rubber, and the resilient elements are made of plastic, preferably polyethylene.

* * * * *